United States Patent
Hurst et al.

[11] Patent Number: 5,702,066
[45] Date of Patent: Dec. 30, 1997

[54] OPTICAL FIBER SPOOL AND METHOD OF LOADING SPOOL

[75] Inventors: Jerry C. Hurst; Brian D. Potteiger, both of Reading, Pa.

[73] Assignee: Lucent Technologies Inc., Murray Hill, N.J.

[21] Appl. No.: 760,846

[22] Filed: Dec. 5, 1996

[51] Int. Cl.$^6$ ................. B65H 75/14; B65H 75/18; B65H 75/24; B65H 18/28

[52] U.S. Cl. ............... 242/601; 242/50; 242/170; 242/605; 242/607.2

[58] Field of Search ................ 242/50, 53, 129, 242/170, 171, 601, 604, 605, 607.2, 609.1; 206/402–406

[56] References Cited

U.S. PATENT DOCUMENTS

| | | | |
|---|---|---|---|
| 3,136,415 | 6/1964 | Sandstrom | 206/403 |
| 3,648,949 | 3/1972 | Berger et al. | 242/50 X |
| 3,913,864 | 10/1975 | Scriven | 242/129 X |
| 4,685,636 | 8/1987 | Eaton | 242/170 X |
| 4,974,789 | 12/1990 | Milburn | 242/171 X |
| 5,109,983 | 5/1992 | Malone et al. | 242/171 X |

*Primary Examiner*—Michael Mansen

[57] ABSTRACT

Optical fiber must be adequately protected during manufacturing, testing, and transportation from physical damage due to over-bending, crushing, and chafing. Prior art methods of packaging optical fiber have been ineffective in protecting against these forms of damage and have required manual assembly, thus their effectiveness being heavily dependent upon operator skill and training. The present invention provides an optical fiber spool that has open and closed positions which allow optical fiber to be loaded into and unloaded from the spool automatically. Furthermore, this spool protects loaded optical fiber from physical damage such as over-bending, crushing, and chafing. The spool of the present invention achieves these goals by providing a plurality of cavities which open and close to capture the optical fiber. These cavities are formed between a plurality of radial tabs positioned around the circumference of a spool lid and over a channel formed within a spool base. A center region of the lid is configured to cause the tabs to pivot from their closed to open position when a sufficient force is applied upon the center region. Once the force is removed, the tabs automatically return to the closed position.

18 Claims, 3 Drawing Sheets

OPTICAL FIBER SPOOL AND METHOD OF LOADING SPOOL

BACKGROUND OF THE INVENTION

This invention relates to spools. Spools are widely used to contain strands of material such as string, wire, and fiber optic cable. More particularly this invention relates to spools for handling optical fiber.

Optical fiber is an extremely delicate material. During manufacturing, testing, and transportation, optical fiber must be handled with utmost care to prevent damage to its fragile inner core. Permanent damage to an optical fiber will occur if the fiber is bent more tightly than a minimum bend radius, even if only momentarily. Furthermore, bending the fiber below a minimum bend radius during testing can cause the fiber to suffer transmission losses that will cause the fiber to appear defective.

In the prior art, optical fibers have been packaged by winding the fibers onto mandrels of a satisfactory radius, sliding the wound fibers off the mandrels, and then securing the wound fibers with twist ties or tape. This approach is problematic in at least four respects. First, once off the mandrel, there is nothing to ensure that a wound fiber maintains at least the minimum bend radius. Second, twist ties can kink or otherwise damage an optical fiber when incorrectly attached. Third, the fiber coils are not well protected from other forms of physical damage, such as crushing and chafing. Fourth, the quality and uniformity of the processes of winding, sliding off, and securing the optical fibers are heavily dependent upon operator skill and training.

It is therefore an object of this invention to provide a spool for optical fiber which will protect the fiber from damage during manufacturing, testing, and transportation.

It is another object of this invention to provide a spool for optical fiber which will ensure that the fiber is not bent more tightly than a minimum bend radius.

It is still another object of this invention to provide a spool for optical fiber which captures the fiber without requiring the use of twist ties or tape.

It is yet another object of this invention to provide a spool for optical fiber in which the fiber will be protected from crushing and chafing.

It is a further object of this invention to provide a spool for optical fiber wherein the fiber may be captured in the spool as part of an automated process.

SUMMARY OF THE INVENTION

These and other objects of the invention are accomplished in accordance with the principles of the invention by providing an optical fiber spool having closed and open positions. In its closed position, the spool captures optical fiber and protects the fiber from physical damage. The spool captures optical fiber by partially enclosing the fiber in a plurality of cavities formed by a circular channel and a plurality of radial tabs positioned on top of, and spaced throughout the circumference of, the circular channel. The enclosures of the cavities not only secure the optical fiber within the spool without requiring the use of twist ties or tape, but also act to protect the fiber from physical damage such as crushing and chafing. These enclosures also prevent bending damage to the optical fiber by having minimum bend radii which exceed, and prevent the fiber from bending more tightly than, the minimum bend radius of the optical fiber.

In its open position, the optical fiber spool enables the optical fiber being loaded into and unloaded from the spool cavities. Loading and unloading of the cavities is facilitated by the radial tabs being pivoted away from the circular channel when sufficient force is exerted upon a domed region of the spool. When this force is applied, the radial tabs pivot away from the circular channel simultaneously under the influence of the domed region to which each radial tab is attached. Once the force is removed from the domed region of the spool, the radial tabs return to their normally-closed position due to the elasticity of the dome and radial tabs. This ability to pivot all of the radial tabs into their open position simultaneously by applying a single force upon the top of the spool and then have the tabs close by removing the force from the spool enables optical fiber being automatically loaded into, captured in, and unloaded from the optical fiber spool.

Further features of the invention, its nature and various advantages will be more apparent from the accompanying drawings and the following detailed description of the preferred embodiments.

BRIEF DESCRIPTION OF THE DRAWINGS

FIG. 1 is taken along the line 1—1 in FIG. 4 but with the optical fiber shown in FIG. 4 ommitted from FIG. 1.

DETAILED DESCRIPTION OF THE PREFERRED EMBODIMENTS

Figure 1:
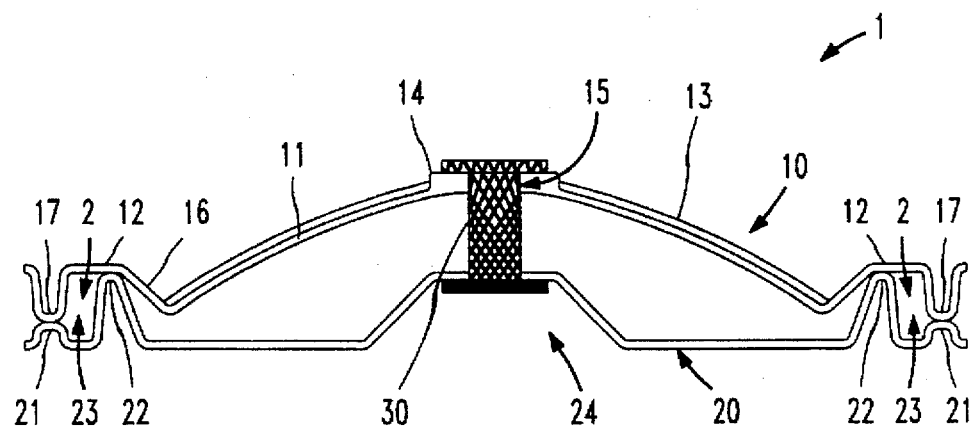
FIG. 1 is a cross-sectional view of an illustrative embodiment of the spool of the present invention showing the spool's lid, base, and fastener in the spool's closed position.

In the illustrative preferred embodiment of the present invention shown in FIGS. 1 through 6, optical fiber spool 1 comprises a lid 10, a base 20, and a fastener 30. These components are arranged such that lid 10 is positioned on top of base 20, and lid 10 and base 20 are secured together by fastener 30. This arrangement forms a plurality of cavities 2 between lid 10 and base 20 in which optical fiber 3 can be captured.

Figure 2:
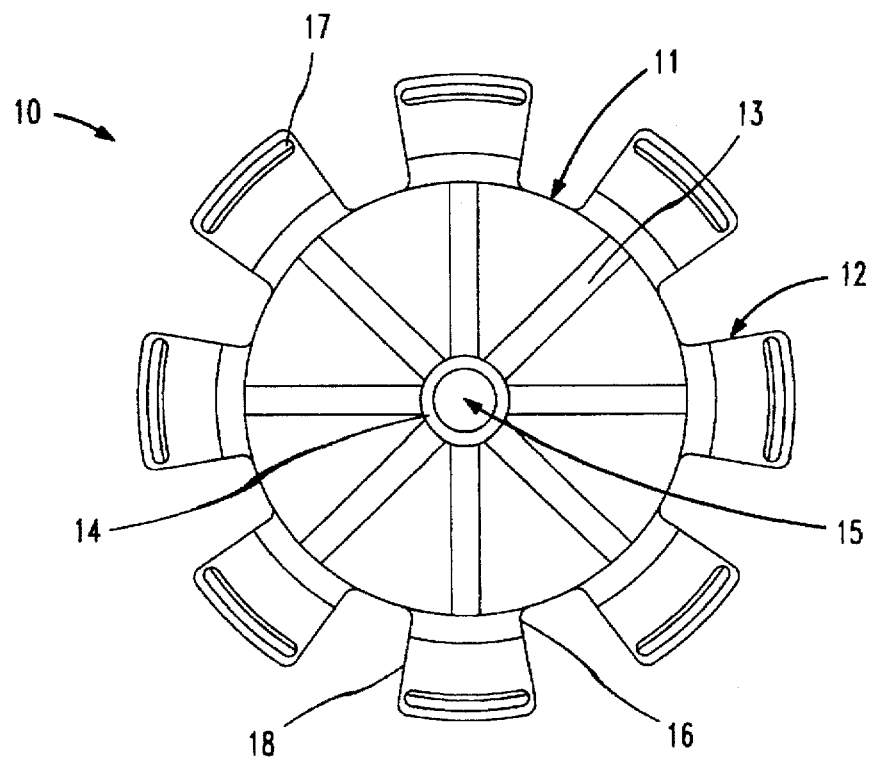
FIG. 2 is a plan view of an illustrative embodiment of the lid of the present invention showing the individual radial tabs.

Referring to FIGS. 1 and 2, it is shown that lid 10 comprises a dome 11 and a plurality of radial tabs 12. Dome 11 forms the center of lid 10 and radial tabs 12 extend outward from the base of dome 11 at equal spacing throughout the circumference of dome 11. A hole 15 is provided in dome 11 to enable lid 10 to be secured to base 20 by fastener 30. A center ring 14 strengthens the region of dome 11 surrounding hole 15. Radiating outward from center ring 14, a plurality of ribs 13 similarly reinforce the remainder of dome 11. Each of ribs 13 terminates at an inner arm 16 of one of radial tabs 12. Each inner arm 16 extends from the base of dome 11 upward and outward, whereby dome 11 and each inner arm 16 form a cross section in the shape of a V. At the upper-and-outer end of each inner arm 16, an outer arm 18 is provided which radiates further outward from, while remaining substantially parallel to, the base of dome 11. Positioned at the outermost end of each of tabs 12 is a tab lip 17 which extends downward from, and runs the width of, outer arm 18.

Figure 3:
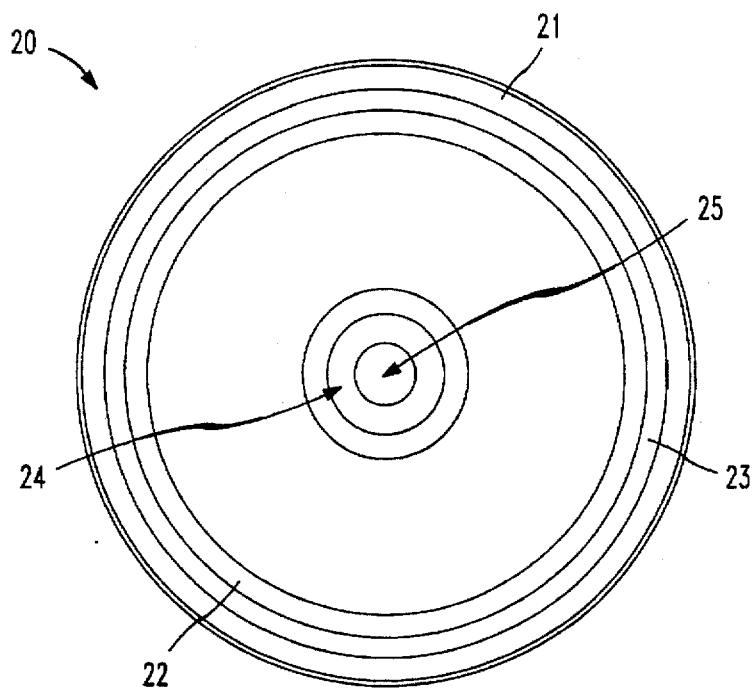
FIG. 3 is a plan view of an illustrative embodiment of the base of the present invention.

As is illustrated in FIGS. 1 and 3, base 20 includes a base lip 21, a base ring 22, a channel 23, a recess 24, and a hole 25. Similarly to hole 15 of lid 10, hole 25 is formed in the center of base 20 and provides a means with which fastener 30 can secure lid 10 to base 20. In the region surrounding hole 25, a recess 24 is formed in the bottom of base 20 which allows fastener 30 to extend downward through hole 25 without extending past the bottom of base 20. Recess 24 may also be properly sized to receive the top of another spool for the purpose of stacking. Toward the perimeter of base 20, channel 23 is formed between base ring 22 and base lip 21. Radial tabs 12 rest upon base ring 22 and base lip 21, thereby enclosing channel 23 in sections throughout its circumference, forming cavities 2. In one embodiment of the present invention, not shown in the figures, base ring 22 may comprise a plurality of depressions in which radial tabs 12 rest. These depressions aid lid 10 in remaining centered in base 20 and prevent the lid from rotating with respect to the base.

Figure 5:
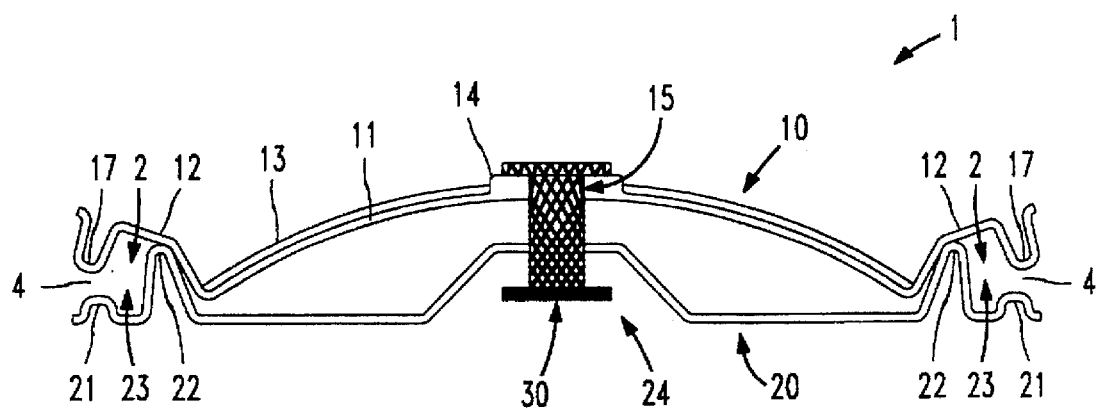
FIG. 5 is a cross-sectional view generally similar to FIG. 1, but showing the spool in its open position.

Optical fiber spool 1 captures optical fiber within cavities 2 by switching between open and closed positions. In the spool's open position, as shown in FIG. 5, tab lips 17 are pivoted away from base lip 21, forming gaps 4 between them. When fully opened, gaps 4 are sufficiently large that optical fiber can pass between tab lips 17 and base lip 21. By passing through gaps 4, optical fiber can be loaded into or unloaded from cavities 2 of spool 1. In the spool's closed position, however, gaps 4 do not exist. As illustrated in FIG. 1, tab lips 17 are pressed against base lip 21 when spool 1 is in its closed position. The lack of gaps between tab lips 17 and base lip 21 when spool 1 is in its closed position, prevents optical fiber from being able to escape cavities 2, thus enabling spool 1 to capture optical fiber.

Spool 1 is switched into its open position when a sufficiently large external force is exerted upon the top of dome 11 of lid 10 in the direction of base 20. As this force causes dome 11 to be displaced toward base 20, the force is transmitted to radial tabs 12, causing them to simultaneously pivot about base ring 22. As inner arms 16 of tabs 12 pivot toward base 20, following dome 11, tab lips 17 move upward and away from base lip 21, forming gaps 4. When this force is removed from dome 11, the elasticity of dome 11 and radial tabs 12 causes lid 10 to return to its normally-closed position wherein tab lips 17 are pressed against base lip 21.

This ability to simultaneously open or simultaneously close radial tabs 12 of spool 1 by respectively applying or removing an external force upon lid 10 facilitates the automated loading and unloading of the spool. In such a process, a loading mechanism depresses dome 11, causing spool 1 to open. Next, the mechanism winds optical fiber into spool 1 by wrapping the optical fiber around base ring 22. As wrapping of the optical fiber continues, optical fiber passes through gaps 4 between tab lips 17 and base lip 21. Finally, once loading of the spool is completed, the mechanism removes its depressive force from dome 11, after which spool 1 closes, thereby capturing optical fiber in cavities 2. Similarly, this process can be used for automated unloading of spool 1, wherein the fiber is unwound from base ring 22 rather than being wrapped around it.

With spool 1 in its closed position, optical fiber captured in cavities 2 is protected from bending, crushing, and chafing damage. Bending damage to optical fiber occurs when the fiber is bent more tightly than its minimum bend radius. Such a tight bend may cause the fragile inner core of the optical fiber to fracture, thereby reducing its transmissive properties. Crushing and chafing damage to the optical fiber occurs when the fiber is brought into contact with compressive or abrasive forces. To protect optical fiber from bending damage, channel 23 of base 20 is configured such that its radius exceeds the minimum bend radius of the optical fiber to be used with spool 1. This configuration protects the optical fiber by preventing it from being bent more tightly than the radius of channel 23, even after winding of the fiber has been completed. To protect the optical fiber from crushing and chafing damage, lid 10 and base 20 have been designed to insulate the fiber from compressive and abrasive forces. These designs sufficiently enclose the optical fiber within cavities 2 such that the risks of crushing and chafing of the fiber is significantly reduced.

Figure 4:
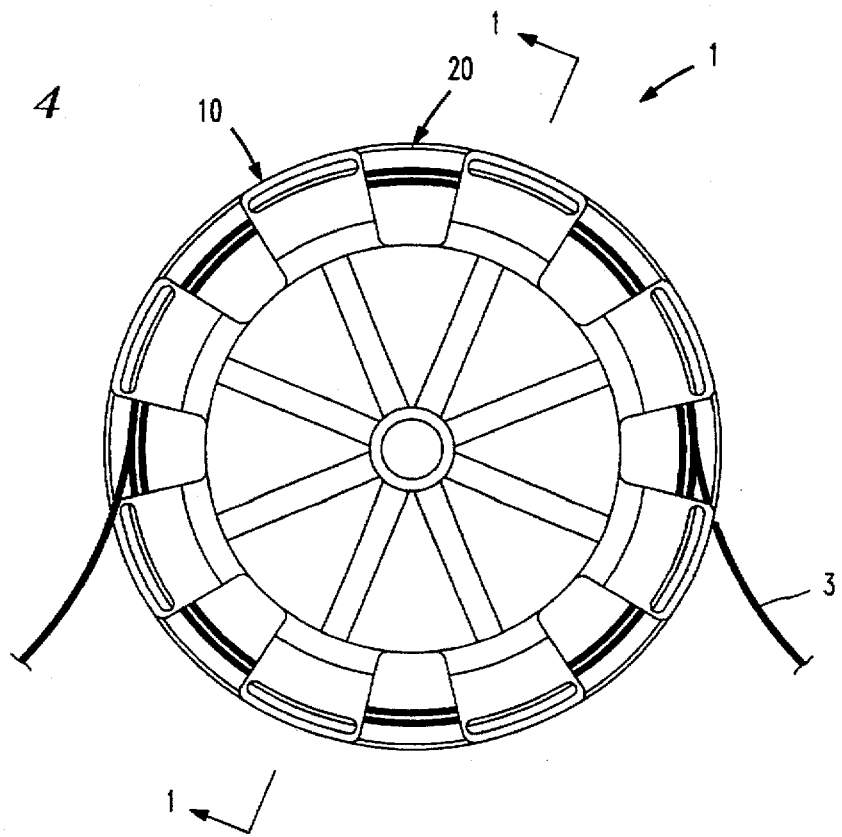
FIG. 4 is a plan view of an illustrative embodiment of the spool of the present invention showing a strand of optical fiber in the spool.

As shown in FIG. 4, the spacing between adjacent radial tabs 12 provides an exit through which the ends of a length of optical fiber 3 can escape cavities 2 of spool 1. In this way, the ends of fiber 3 can be connected to test equipment or optical fiber components attached during testing and manufacturing. In order to prevent bending damage to optical fiber 3, the spacing between radial tabs 12 must be sufficiently large as to allow optical fiber 3 to bend outward from the spool without requiring a bend of fiber 3 tighter than the fiber's minimum bend radius.

Preferably, lid 10 and base 20 are formed from an ESD (Electro-Static Discharge) safe, light-weight, vacuum-formed plastic. The material chosen for lid 10 must be sufficiently resilient to allow dome 11 and radial tabs 12 to resist plastic deformation when switching between the open and closed positions of spool 1. By remaining in elastic deformation when switched to the open position, dome 11 and radial tabs 12 can "spring back" to their original shapes after the external force upon spool 1 has been removed.

Figure 6:
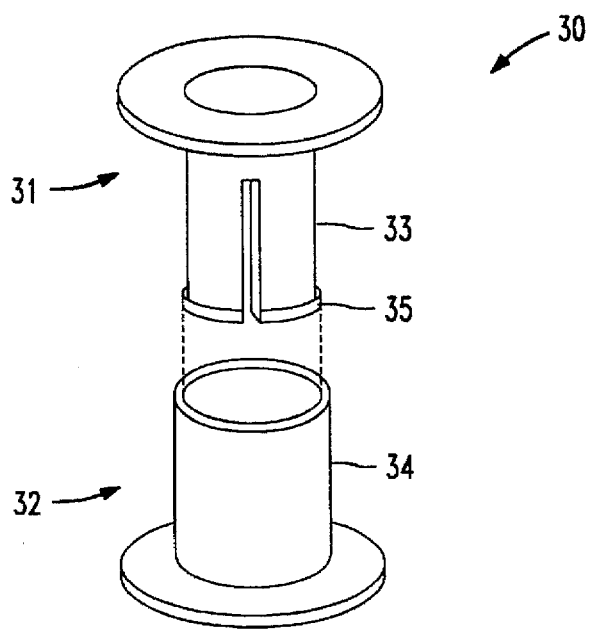
FIG. 6 is an axonometric, exploded view of an illustrative embodiment of the spool fastener of the present invention.

Referring to FIG. 6, fastener 30 is illustrated. Fastener 30 comprises an upper half 31 and a lower half 32 which snap together to form a cross section with the shape of an I. Upper half 31, having a cross section with the shape of a T, and lower half 32, having a cross section with the shape of an inverted T, are each configured such that their vertical members 33 and 34 are cylindrically shaped. Upper half vertical member 33 is sized slightly smaller than lower half vertical member 34 such that the former can fit inside the latter. At the bottom of vertical member 33 of upper half 31, a lip 35 is formed, which, when passed all the way through vertical member 34 of lower half 32, causes the upper and lower halves to snap together. By passing upper half 31 of fastener 30 downward through hole 15 of lid 10 and passing lower half 32 of fastener 30 upward through hole 25 of base 20, lid 10 and base 20 can be secured together as shown in FIG. 1.

It will be understood that the foregoing is only illustrative of the principles of the invention and that various modifications can be made by those skilled in the art without departing from the scope and spirit of the invention. For example, the spool of the present invention could be used to contain strands of material other than optical fiber such as wire, string, or fishing line; fastener 30 could be replaced with a screw-together type faster and/or could be incorporated into lid 10, base 20, or both; dome 11 could have a shape which is convex (as in the preferred embodiment), flat, or concave; center ring 14 and/or ribs 13 could be eliminated in cases where dome 11 is sufficiently strong without them; any number of radial tabs 12 could be provided; tab lips 17 and/or base lip 21 could be eliminated in cases where cavities 2 could be closed without them; holes 15 and 25 could be eliminated where the means of securing lid 10 to base 20 requires no holes; and recess 24 could be eliminated in cases where fastener 30 could be permitted to pass beyond, or fastener 30 no longer projected through, the bottom of base 20.

The invention claimed is:

1. A spool having a normally-closed position for storing strands of material and an open position for loading and unloading of the strands of material, wherein said spool comprises:

a lid having a circular center region and a plurality of radial tabs spaced throughout the circumference of said circular center region; and a base secured to said lid, wherein a plurality of cavities are formed between said base and said plurality of radial tabs, said plurality of radial tabs pivot into said open position when an external force is applied upon said circular center region of said lid, and said plurality of radial tabs maintain said normally-closed position when said external force is not being applied upon said circular center region of said lid.

2. The spool of claim 1, wherein said circular center region is dome shaped.

3. The spool of claim 1, wherein said circular center region comprises a plurality of ribs.

4. The spool of claim 1, wherein said plurality of radial tabs each comprise a tab lip that presses upon said base in said normally-closed position.

5. The spool of claim 1, wherein said base comprises a base ring upon which said plurality of radial tabs pivot.

6. The spool of claim 5, wherein said base ring comprises a plurality of depressions in which said plurality of radial tabs pivot.

7. The spool of claim 5, wherein said base ring has a bend radius exceeding the minimum bend radius of the strands of material.

8. The spool of claim 1, wherein said base comprises a base lip upon which said plurality of radial tabs press in said normally-closed position.

9. The spool of claim 1, wherein said base is secured to said lid by a fastener passing through a hole in said base.

10. The spool of claim 9, wherein said base comprises a recess on the bottom of said base around said hole so that a fastener can occupy said recess when said spool is in said open position.

11. The spool of claim 1, wherein said base comprises a recess which receives the top of another spool for the purpose of stacking.

12. The spool of claim 1, wherein said base is secured to said lid by a fastener passing through a hole in said lid.

13. The spool of claim 1, wherein said plurality of radial tabs are equally spaced throughout the circumference of said circular center region.

14. The spool of claim 1, wherein said plurality of radial tabs are separated by a spacing which is sufficiently wide as to allow the strands of material to exit said spool without bending more tightly than the minimum bend radius of the strands of material.

15. A method of loading a spool having a normally-closed position and an open position with strands of material, wherein said method comprises the steps of:

applying and maintaining a force upon said spool to cause said spool to switch to said open position;

winding said strands of material into said spool while said spool is in said open position;

removing said force from said spool to cause said spool to switch to said normally-closed position.

16. The method of claim 15, wherein said applying and maintaining step applies and maintains said force upon a center region of a top side of said spool.

17. The method of claim 15, wherein said applying and maintaining step causes a plurality of tabs to pivot into said open position.

18. The method of claim 15, wherein said removing step causes a plurality of tabs to pivot into said normally closed position.

* * * * *